United States Patent [19]
Bader et al.

[11] 3,925,493
[45] Dec. 9, 1975

[54] PROCESS FOR PREPARING DICHLOROHEXADIENES

[75] Inventors: Andre A. Bader; Francis J. Weiss, both of Pierre-Benite, France

[73] Assignee: Produits Chimiques Ugine Kuhlmann, Paris, France

[22] Filed: Apr. 20, 1970

[21] Appl. No.: 28,256

Related U.S. Application Data

[63] Continuation of Ser. No. 636,672, May 8, 1967, abandoned.

[30] Foreign Application Priority Data

May 13, 1966  France ............................ 66.61472

[52] U.S. Cl. ....................... 260/654 R; 260/635 A
[51] Int. Cl.² .......................................... C07C 21/02
[58] Field of Search ..................... 260/654 R, 635 A

[56] References Cited
UNITED STATES PATENTS

| | | | |
|---|---|---|---|
| 1,972,887 | 9/1934 | Greenewalt | 260/654 R X |
| 3,111,545 | 11/1963 | Nobis et al. | 260/652 |
| 3,240,822 | 3/1966 | Braun | 260/635 A |

OTHER PUBLICATIONS

Martinet and Delepine, Comptes Rendus de l'Academie des Sciences (1957), 245, pp. 181–183.

*Primary Examiner*—Delbert E. Gantz
*Assistant Examiner*—Joseph A. Boska
*Attorney, Agent, or Firm*—Pennie & Edmonds

[57] ABSTRACT

Dichlorohexadienes are prepared by reacting divinylglycol with hydrogen chloride in the presence of a catalytic amount of a soluble salt of magnesium, aluminum, iron, zinc and copper.

3 Claims, No Drawings

PROCESS FOR PREPARING DICHLOROHEXADIENES

This application is a continuation application of our prior application, Ser. No. 636,672, now abandoned, filed May 8, 1967 and entitled Process for Preparing Dichlorohexadienes.

BACKGROUND OF THE INVENTION

I. Field of the Invention

This invention relates to a process for preparing dichlorohexadienes by direct chlorination with hydrogen chloride.

II. Description of the Prior Art

Divinylglycol (1:5-hexadiene-3:4 diol), has been successfully chlorinated with phosphorus pentachloride to produce a mixture of 1:6-dichloro-2:4-hexadiene and 5:6-dichloro-1:3-hexadiene (Comptes Rendus de l'Academie des Sciences 1957, 245, p.181). The high cost of the chlorinating agent, phosphorus pentachloride, combined with the necessity of the reaction to be carried out in an anhydrous reaction medium render the process commercially unattractive.

Although direct chlorination of certain alcohols with hydrochloric acid has been reported, it is recognized that chlorinating alcohols containing double bonds in the molecules with hydrochloric acid is highly unpredictable. The presence of the double bond oftentimes hinders or prevents the chlorination. Examples of alcohols which can be directly chlorinated by reacting with hydrochloric acid are ethylenic diols such as 2-butene-1:4-diol. The reaction of 2-butene-1:4 diol with hydrochloric acid produces a chlorinated butandiol which is in turn cyclized into chlorotetrahydrofuran by dehydration (Ann. 1955, 596, 140). Yet, the reaction of divinylglycol with anhydrous or aqueous hydrochloric acid in experiments conducted by us showed an immediate darkening of the reaction mixture and let to almost exclusive formation of undistillable polymerized high molecular weight products instead of the formation of the expected dichlorinated derivatives.

SUMMARY OF THE INVENTION

The present invention is based on the discovery that dichlorohexadienes can be successfully prepared by reacting divinylglycol with hydrogen chloride in the presence of a catalyst. Broadly stated the process of this invention comprises reacting divinylglycol with at least a stoichiometric amount of hydrogen chloride in a suitable medium and in the presence of a catalytic amount of a salt of magnesium, aluminum, iron, zinc or copper which is soluble in the reaction medium.

The use of catalysts in accordance with the process of this invention, completely changes the reaction mechanism and is remarkably effective in suppressing the complex reactions which occur when chlorination with hydrogen chloride is carried out without the catalyst. The substitution of the chlorine atoms in the unsaturated molecules according to the invention occur essentially with allylic transposition to produce predominately 1:6-dichloro-2:4-hexadiene and 5:6-dichloro-1:3-hexadiene isomers of which the 1:6 isomeric form is preponderant.

Dichlorohexadienes due to the great reactivities of the chlorine atoms which have an allylic character and the two conjugated double bonds, are valuable intermediates for preparing polyfunctional and polycondensation products which in turn are used, for example, in the production of synthetic resins. Dichlorohexadienes are also used for preparing 1:6-dichlorohexane by saturating the double bonds by hydrogenation. 1:6-dichlorohexane can then be treated with ammonia in a known manner to produce hexamethylenediamine which is used to prepare polyamides such as Nylon 66. Dichlorohexadienes have direct applications as agricultural chemicals and are used successfully as nematocides.

DESCRIPTION OF THE PREFERRED EMBODIMENTS

The reaction of divinylglycol and hydrogen chloride may be carried out in an aqueous medium or in an anhydrous solution in the presence of 0.05 to 10% of the metal salt catalyst calculated based on the weight of the divinylglycol used in the reaction. Preferably the reaction is conducted at a temperature in the range between 0° and 50°C. and at this temperature range the reaction period is about ½ to 5 hours.

When the reaction is in the aqueous medium, the process of this invention is advantageously carried out by introducing divinylglycol, which may be in a substantially pure form, into an aqueous solution of hydrochloric acid having about 20–40% by weight of HCl and wherein the suitable amount of catalyst, 0.05 to 10% and preferably 0.5 to 5% by weight of the divinylglycol to be used, is dissolved therein. The amount of hydrogen chloride in the solution should be at least the stoichiometric amount and generally it is advantageous to use 2 to 5 times the theoretic quantity to insure the complete transformation of the more valuable glycol. The dichlorohexadienes thus produced are substantially insoluble in the reaction medium and a major portion is precipitated therefrom. The product can be recovered by a decanting operation. The portion of the product which remains in the aqueous medium is recovered advantageously by solvent extraction using a substantially water immiscible solvent such as ether, benzene, methylisobutylketone, etc. The extracts include unreacted divinylglycol and the partially chlorinated products which can be separated from the dichlorohexadienes by distillation.

When the reaction is in a substantially anhydrous solvent such as tetrahydrofuran, tetrahydropyran, dioxane, diethyleneglycoldimethylether, the process is preferably carried out by dissolving divinylglycol and the soluble metallic salt in the solvent to form a reaction solution and thereafter saturates the solution with hydrogen chloride by bubbling dry HCl into the solution.

The reaction may also be conducted in a mixture of aqueous and organic solvents. For example, the reaction may be carried out by treating an organic divinylglycol solution, the solvent for which is substantially inert to the acid, with a hydrochloric acid solution having dissolved therein the required amount of catalyst.

Many salts of magnesium, aluminum, iron, zinc and copper can be used for the process of the present invention. The selection is based to a certain extent on the solubilities of these metallic salts in the reaction mediums. The salts may be inorganic such as cuprous chloride, ferric chloride and zinc chloride, or they may be organic salts such as cupric acetate and zinc acetate. Other suitable catalysts that may be used include magnesium chloride, magnesium sulfate, magnesium formate, magnesium acetate, aluminum chloride, aluminum sulfate, aluminum acetate, ferric nitrate, cupric chloride, cupric sulfate, cupric nitrate.

It is advantageous to prepare divinylglycol by well known duplicative reduction process wherein acrolein is reduced by metals, such as copper, zinc or a mixture of metals such as zinc-copper mixture or a zinc amalgam, in the presence of an acid such as acetic acid. Since the reaction is normally carried out in either an aqueous medium or in an ether of the type used for the process of this invention, the recovery of the divinylglycol for the purpose of producing dichlorohexadienes may be omitted. The chlorination may be effected directly by the introduction of dry gaseous HCl to the product solution which generally contains a sufficient amount of copper or zinc salts such as copper and zinc acetate to catalyze the chlorination. If necessary, additional copper or zinc salts or other suitable catalyst referred to hereinabove may be added to supplement the metallic salts in the solution.

Further to illustrate this invention, specific examples are described hereinbelow. In the examples the "parts" referred to therein are parts by weight.

EXAMPLE I 5 parts of cuprous chloride was dissolved in 470 parts of an aqueous hydrochloric acid solution containing 35% HCl by weight and then 100 parts of divinylglycol were progressively added thereto while maintaining the temperature of the reactants at 25°–30°C. by cooling with suitable means. The reaction mixture was allowed to react for an hour at the same temperature and thereafter was poured into 400 parts of cold water. The aqueous mixture was neutralized by adding thereto sodium carbonate. 100 parts of diethyl ether were added to the aqueous mixture and to dissolve the crystals produced by the reaction. The aqueous and organic phases were separated. The aqueous phase was washed with 2 new parts of ether which was recovered and was added to the first organic phase. The combined organic liquids were subjected to a distillation treatment initially at atmospheric pressure and than at reduced pressure of 6 mm Hg at a temperature between 76°–84°C. 111 parts of dichlorohexadienes mixture equivalent to 83.5% of the theoretical yield was recovered. Analysis by gas chromatography and by a fractional distillation of the mixture showed it consists of 83% (trans-trans) 1:6-dichloro-2:4-hexadiene melting at 28°–29°C. and 17% 5:6-dichloro-1:3-hexadiene.

The remaining 12 parts of the nondistilled product contained about 5 parts of unreacted divinylglycol and a small amount of monochlorinated derivative and heavy residues.

EXAMPLE II

This experiment is carried out in the form of a comparative test intended to bring out the advantage of the invention.

20 parts of divinylglycol were reacted with 95 parts of a hydrochloric acid containing 35% HCl under the conditions set forth in Example I, but with the exception that copper salt or other catalytic salt was not used.

The reaction medium immediately darkened, and it was not possible to observe any immiscible product. Ether extractions followed by distillation of the extract recovered 4.6 parts unreacted divinylglycol and 5 parts of residue. No dichlorohexadiene was isolated.

EXAMPLE III

This example pertains to the direct preparation of dichlorohexadiene from acrolein without isolation of the intermediate divinylglycol. A zinc-copper couple was prepared initially by adding 120 parts of metallic zinc powder in an aqueous solution containing 157 parts of copper sulfate ($CuSO_4.5H_2O$) in 5000 parts of water. The resultant couple was filtered and washed with dioxane. The couple of zinc and copper was then placed in a flask equipped with a stirrer and contained therein 800 parts of dioxane and 160 parts of 96% acrolein. 240 parts of acetic acid were then progressively added into the flask. After standing for one night at room temperature, the precipitated metals and salts were filtered. The solution was concentrated to about ½ of its original volume by distillation. The distillation also eliminated the unreacted acrolein. 520 parts of the solution contains 67 parts of divinlyglycol, 0.14 parts of copper acetate computed based on the weight of metallic copper and some zinc acetate were obtained.

A portion of this solution, 150 parts which contained 19.3 parts of divinylglycol and 0.04 parts of copper (about 0.2% by weight based on the divinylglycol in the solution), was treated with a stream of gaseous HCl until the solution was substantially saturated with HCl. After one hour of continuous stirring, the mixture was neutralized by the addition thereto of a solid sodium bicarbonate. Two liquid phases were formed and were separated. The upper layer consisted of 103.5 parts in which 15.9% by weight was 1:6-dichloro-2:4-hexadiene and 4.7% by weight was 5:6-dichloro-1:3-hexadiene. 21 parts of the dichlorohexadienes were recovered by distillation which is equivalent to 82% of the theoretical yield based on the amount of divinylglycol in the solution.

A second experiment was conducted with a second portion of 150 parts of raw divinyl solution to which there was added 1.2 parts of cuprous chloride as a complementary catalytic agent. By the same procedure described hereinabove 24.4 parts of a dichlorohexadiene mixture was obtained which represents 91% of the yield.

EXAMPLE IV

An experiment was conducted under the same conditions set forth in Example I and with the same amount of reagents, but with the exception that 5 parts of zinc chloride were used as a catalyst instead of copper chloride. The reaction produced 72 parts of dichlorohexadienes which is equivalent to 54.5% of the theoretical yield. The reaction product contains about 92% by weight of the 1:6 dichlorinated isomer.

We claim:

1. In a process for preparing dichlorohexadienes which comprises reducing acrolein by a known manner in a solution with a metal selected from the group consisting of copper, zinc or a mixture thereof or a zinc amalgam in the presence of an acid capable of forming a soluble metal salt with said metal to produce divinylglycol, the improvement comprising introducing at least a stoichiometric amount of HCl to the resultant reaction mixture and continuing the reaction to produce dichlorohexadienes therefrom.

2. A process according to claim 1 wherein the solvent for the acrolein solution is dioxane, the metal is a zinc-copper mixture and the acid is acetic acid.

3. A process according to claim 2 wherein the HCl is in a gaseous form.

* * * * *